Patented Sept. 8, 1931

1,822,266

UNITED STATES PATENT OFFICE

FREDERICK M. BECKET, OF NEW YORK, N. Y., ASSIGNOR TO ELECTRO METALLURGICAL COMPANY, A CORPORATION OF WEST VIRGINIA

PURIFICATION OF ORES

No Drawing.   Application filed November 17, 1928. Serial No. 320,218.

The invention is a process of treating stanniferous ores to eliminate a part or substantially all of the tin therefrom and thereby produce a material which can be smelted to recover its content of metals other than tin. The invention is especially adapted for the treatment of ores containing tin together with one or both of the metals columbium and tantalum, and the treatment of such an ore will be described by way of example. These ores as a rule contain a mixture of columbium and tantalum minerals and cassiterite (tin oxide).

The ore is ground, for example to 60 or 80 mesh fineness, and mixed with an excess of carbonaceous reducing agent over that necessary for the complete reduction of the tin. The reducing agent may be charcoal, coke, coal, or the like, and is preferably finely ground. A layer of the reducing agent may be placed on the surface of the charge of the foregoing mixture. The charge is then heated to, say 1000° C., and maintained at such temperature until the tin is reduced. The charge is then cooled under such conditions that the tin does not reoxidize.

After cooling, the charge is crushed, mixed with a chlorinating agent, which is preferably a chlorine compound, and heated. The best results have been obtained when a plurality of chlorine compounds of different volatility are employed so that chlorinating agent may be present in vapor phase at the various temperatures as the charge is heated. Thus the crushed reduction product may be mixed with ammonium chloride either dry or in solution, and also with aqueous hydrochloric acid and sulphur chloride. When liquid chlorinating agents are used, the mixture should be allowed to stand for a time to permit these agents to act on the tin.

The temperature is then raised until the tin is expelled as chloride. The temperature required for this purpose may be 1100° C., more or less. The tin chloride can of course be recovered if the quantity produced warrants such a step. The tin content of the treated ore can easily be brought to 0.1% or less.

An example showing typical results obtainable by this process is given below:—

One hundred parts of columbite ore containing 66.90% $Cb_2O_5 + Ta_2O_5$ and 6.40% Sn, and which had been ground to a fineness of 100 mesh, were mixed with 6¼ parts of 60 mesh charcoal and heated for two hours at a temperature of 1000° C. to effect reduction of the tin to the metallic condition. The product after cooling was finely ground and mixed with chlorinating reagents in the following proportions:

|  | Parts |
|---|---|
| Partially reduced columbite | 454 |
| Ammonium chloride | 29 |
| Hydrochloric acid (aqueous) | 5 |
| Sulphur chloride | 4 |

After the mixture was held for a few hours at room temperature to promote the reaction between the chlorinating reagents and the tin, the temperature was slowly raised to 1000° C. and held until evolution of fumes had ceased. The product analyzed 76.23% $Cb_2O_5 + Ta_2O_5$ and 0.09% Sn.

I claim:

1. The process of separating tin from columbium ores which comprises reducing the tin to the metallic state by heating the ore in the presence of a carbonaceous reducing agent, mixing the product of this step with ammonium chloride and a more volatile chlorine compound; and heating the mixture to volatilize the tin as tin chloride.

2. The process of separating tin from the ores of other metals which comprises reducing the tin to the metallic state by heating the ore in the presence of a carbonaceous reducing agent; mixing the product of this step with ammonium chloride and a more volatile chlorine compound; and heating the mixture to volatilize the tin as tin chloride.

3. The process of separating tin from columbium ores which comprises reducing the tin to the metallic state; mixing the ore with ammonium chloride and a more volatile liquefied chlorinating agent at a temperature below the vaporizing temperature of the latter; and heating the mixture until the chlorine is expelled, carrying with it the tin as tin chloride.

In testimony whereof, I affix my signature.

FREDERICK M. BECKET.